(12) United States Patent
Shuter

(10) Patent No.: US 7,117,884 B2
(45) Date of Patent: Oct. 10, 2006

(54) VALVE LOCKING DEVICE

(76) Inventor: Charles Frederick Thomas Shuter, 105 Grandview Road, Pullenvale, QLD 4069 (AU)

( * ) Notice: Subject to any disclaimer, the term of this patent is extended or adjusted under 35 U.S.C. 154(b) by 242 days.

(21) Appl. No.: 10/471,826

(22) PCT Filed: Mar. 7, 2002

(86) PCT No.: PCT/AU02/00254

§ 371 (c)(1),
(2), (4) Date: Sep. 15, 2003

(87) PCT Pub. No.: WO02/079680

PCT Pub. Date: Oct. 10, 2002

(65) Prior Publication Data

US 2004/0094205 A1    May 20, 2004

(30) Foreign Application Priority Data

Mar. 30, 2001  (AU) ..................... 33379/01

(51) Int. Cl.
*F16K 35/00* (2006.01)
(52) U.S. Cl. .................. 137/385; 251/95; 251/113; 251/70; 251/179
(58) Field of Classification Search ................ 137/385; 251/95, 111, 113; 70/179
See application file for complete search history.

(56) References Cited

U.S. PATENT DOCUMENTS

| | | | | | |
|---|---|---|---|---|---|
| 932,437 | A | * | 8/1909 | Brady ........................ | 70/180 |
| 1,016,872 | A | * | 2/1912 | Corner ....................... | 70/179 |
| 1,123,858 | A | * | 1/1915 | Deckebach ................. | 70/180 |
| 1,275,135 | A | * | 8/1918 | Cunningham ............... | 70/179 |
| 4,377,178 | A | * | 3/1983 | Thompson .................. | 137/385 |
| 4,926,900 | A | * | 5/1990 | Pietras ....................... | 137/385 |
| 4,971,289 | A | * | 11/1990 | Pietras ....................... | 251/90 |

* cited by examiner

Primary Examiner—A. Michael Chambers

(57) ABSTRACT

A valve locking device comprising an intermediate member (18) mountable between a valve body and valve actuator and securable to said valve body and/or actuator; a stem attachment member (20) attachable to and rotatable with a valve stem (14) and contained at least partially within said intermediate member, and an engagement member (22) movably located within said intermediate member for selective engagement with said stem attachment member; whereby in use, engagement between said engagement member and said stem attachment member prevents rotation of said stem attachment member, thus preventing rotation of said valve stem to operate the valve.

15 Claims, 4 Drawing Sheets

VALVE LOCKING DEVICE

FIELD OF THE INVENTION

The present invention relates to valve locking devices for locking a valve in a particular position to prevent it moving from an open position to a closed position or vice versa. In particular, the present invention relates to a valve locking device which is mountable between a valve and valve actuator.

BACKGROUND TO THE INVENTION

In many industrial installations valves are used in circumstances where their incorrect operation could lead to accidents resulting in serious damage or injury. For example, many factories utilise pressure vessels which need to be entered by workers for maintenance and/or repair. It is essential that valves controlling supply of fluid under pressure to such vessels are locked in the shut or closed position when such maintenance or repair is taking place. In other situations it may be important for safety purposes that a valve is not closed. For example, closing a valve may prevent adequate ventilation.

Typically butterfly valves, ball valves and plug valves are used under the circumstances referred to. Butterfly valves, ball valves and plug valves typically require only a quarter turn of an operating spindle between closed and open positions. However, some ball valves require rotation of an operating spindle through 180 degrees between closed and open positions. A valve actuator is typically used to rotate an operating spindle.

Past attempts to address the abovementioned safety issues have involved placing a hood over the valve actuator. However, the hoods are typically cumbersome to use and not always effective.

The inventor of the present invention developed the valve locking device which is described in South African Patent No. 97/10910 for the purpose of addressing the abovementioned safety issues. The valve locking device of South African Patent No. 97/10910 generally comprises a rigid metal u-shaped frame which has a cross plate that is welded to extend across the mouth of the u-shaped frame. The u-shaped frame is designed to slidably receive a spindle engaging plate that has a slot formed in one of its ends.

The u-shaped frame is designed to mount between a valve and its corresponding valve actuator in the process of assembling the valve and valve actuator. The slot of the spindle engaging plate is designed so that it receives a square sectioned spindle of the valve, which extends between the valve and valve actuator, when the spindle engaging plate is appropriately received in the u-shaped frame. Rotation of the spindle is prevented when the spindle is positioned within the slot of the spindle receiving plate. The cross plate and spindle engaging plate have corresponding holes to enable the spindle engaging plate to be fixed relative to the cross plates, ensuring that the spindle ngaging plate remains fixed relative to the u-shaped frame.

While the valve locking device of 97/10910 addresses the abovementioned safety issues, the inventor estimates that it may be prone to failure after 100 cycles at approximately 50% torque.

It is therefore desirable to provide an improved valve locking device.

SUMMARY OF THE INVENTION

In the first aspect, the present invention provides a valve locking device comprising:

an intermediate member mountable between a valve body and valve actuator and securable to said valve body and/or valve actuator;

a stem attachment member attachable to and rotatable with a valve stem, and contained at least partially within said intermediate member; and an engagement member movably located within said intermediate member for selective engagement with said stem. attachment member;

whereby in use, engagement between said engagement member and said stem attachment member prevents rotation of said stem attachment member, thereby preventing rotation of said valve stem to operate the valve.

Suitably said engagement member is slidably movable in said intermediate member.

If required, said stem attachment member may b adapted to extend into a recess in said valve body to increase surface engagement between said valve stem and said stem attachment member.

Suitably said engagement member may be locked in an engaged position or a disengaged position.

The device may include a locking means for locking said engagement member in an engaged position or a disengaged position.

If required the stem attachment member may be adapted for engagement with said engagement member in two or more rotationally spaced positions.

In a second aspect, the present invention provides a combination of a valve locking device of the first aspect of the present invention, a valve, and valve actuator, wherein operation of the valve by the valve actuator is preventable by said valve locking device.

The valve actuator of the second aspect of the present invention may be a powered mechanism.

Alternatively, the valve actuator of the second aspect of the present invention may be manually operated.

BRIEF DESCRIPTION OF THE DRAWINGS

A preferred embodiment of the present invention will now be described by way of example only, with reference to the accompanying drawings in which.

BEST MODE FOR CARRYING OUT THE INVENTION

Figure 1:
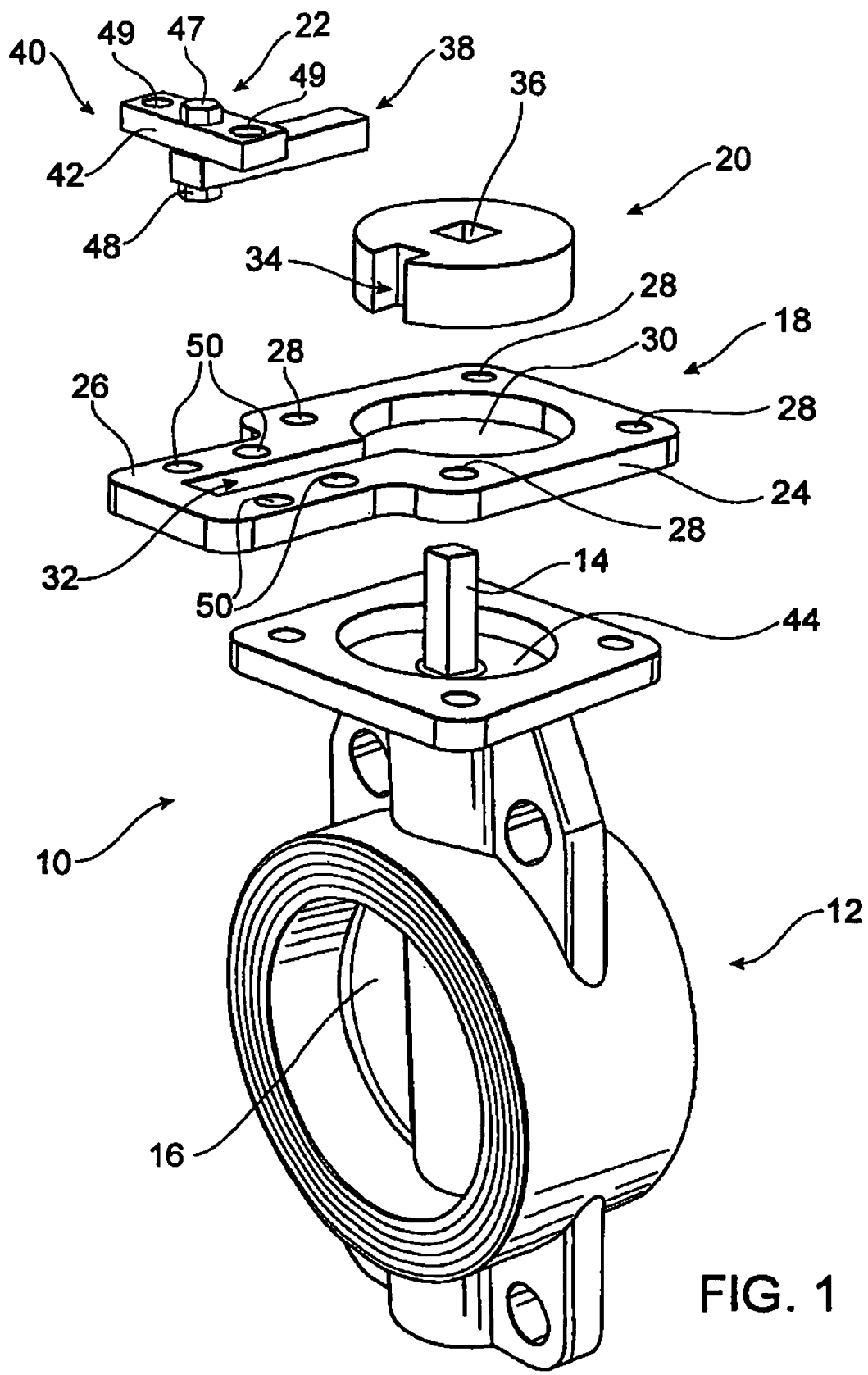
FIG. 1 is an isometric view of a butterfly valve, and a valve lock wherein the components of the valve lock are unassembled.

Referring to FIG. 1, a butterfly valve 12 having an end 10, from which a spindle 14 extends, is typically bolted to a valve actuator (not shown). The valve actuator functions to rotate the spindle 14 of the butterfly valve 12. Rotation of the spindle 14 results in movement of a valve 16 of the butterfly valve 12 between open and closed positions.

The unassembled valve lock of FIG. 1, which provides an example of the valve locking device, comprises a plate 18, a cylindrically shaped spindle receiving disc 20 and a key 22. The plate 18, spindle receiving disc 20 and key 22 provide an example of the intermediate member, spindle attachment member and engagement member respectively. One end 24 of the plate 18 is generally square in shape while the other end 26 of the plate 18 is generally rectangular in shape. However, It will be appreciated by a person skilled in the relevant field that depending on the shape of a valve and/or valve actuator, a plate could be shaped differently to the plate 18 to enable it to be mounted between the valve and valve actuator. and secured to either or both the valve and valve actuator. The rectangular shaped end 26 is positioned centrally relative to the square end 24. Four holes 28 are formed in corner regions of the square end 24 for mounting of the plate 18 between the butterfly valve 12 and valve actuator. However as explained above, the position, number and spacing of holes formed in a plate which is mounted between a valve and valve actuator may vary in accordance with engineering design practice, dependent on the particular valve and valve actuator.

Material is removed from both the square and rectangular shaped ends 24 and 26 to allow for receipt of the spindle receiving disc 20 and key 22 respectively. A hole 30 is formed in the square shaped end 24 so that an axis of the hole 30 extends transversely relative to the plate 18 and is approximately centrally positioned within the square shaped end 24. A slot 32 is formed in the rectangular shaped end 26. The slot 32 is one example of the guide means. The slot 32 is positioned approximately centrally across the width of the rectangular shaped end 26 and extends from one end of the rectangular shaped end 26 beyond the other end of the rectangular shaped end 26 and into the square shaped end 24 so that the slot 32 intersects the hole 30. The hole 30 and slot 32 extend through the thickness of plate 18.

The diameter of the spindle receiving disc 20 is such that it can fit into the hole 30. A square shaped slot 34 is formed in the spindle receiving disc 20. The square shaped slot 34 extends through the thickness of the spindle receiving disc 20. A distance of approximately 17 mm separates the longitudinal axis of the spindle receiving disc and the square shaped slot 34.

A square shaped hole 36 which extends through the thickness of the spindle receiving disc 20 is positioned centrally off the spindle receiving disc 34. Each wall which forms the square shaped hole 36 is approximately 19 mm in length. Two of the walls which form the square shaped hole 36 are parallel to and aligned with two opposite walls which form the square shaped slot 34. The square shaped hole 36 is suitably dimensioned to receive the square sectioned spindle 14 of the butterfly valve 12.

The key 22 includes a rectangular bar 38 which is suitably dimensioned for receipt in the square shaped slot 32 of the plate 18. The key 22 also includes a rectangular sectioned cross member bar 40 which extends transversely of the rectangular sectioned bar 38. The rectangular sectioned cross member bar 40 is position d at one nd of the rectangular sectioned bar 38 so that a longitudinal wall 42 of the rectangular sectioned cross member bar 40 is flush with an end of the rectangular sectioned bar 38. The rectangular sectioned bar 38 and rectangular sectioned cross member bar 40 are orientated relative to each other so that each of them contact the other via wider rather than narrower walls. The rectangular sectioned bar 38 and rectangular sectioned cross member bar 40 are welded and also bolted together.

The plate 18, spindle receiving disc 20 and key 22 are assembled between the butterfly valve 12 and valve actuator as follows. The plate 18 is positioned against an end 10 of the butterfly valve 12 by passing bolts through holes 28 of the plate 18. With the plate 18 positioned in this way the spindle 14 of the butterfly valve 12 extends approximately centrally through the hole 30 of the plate 18.

Figure 2:
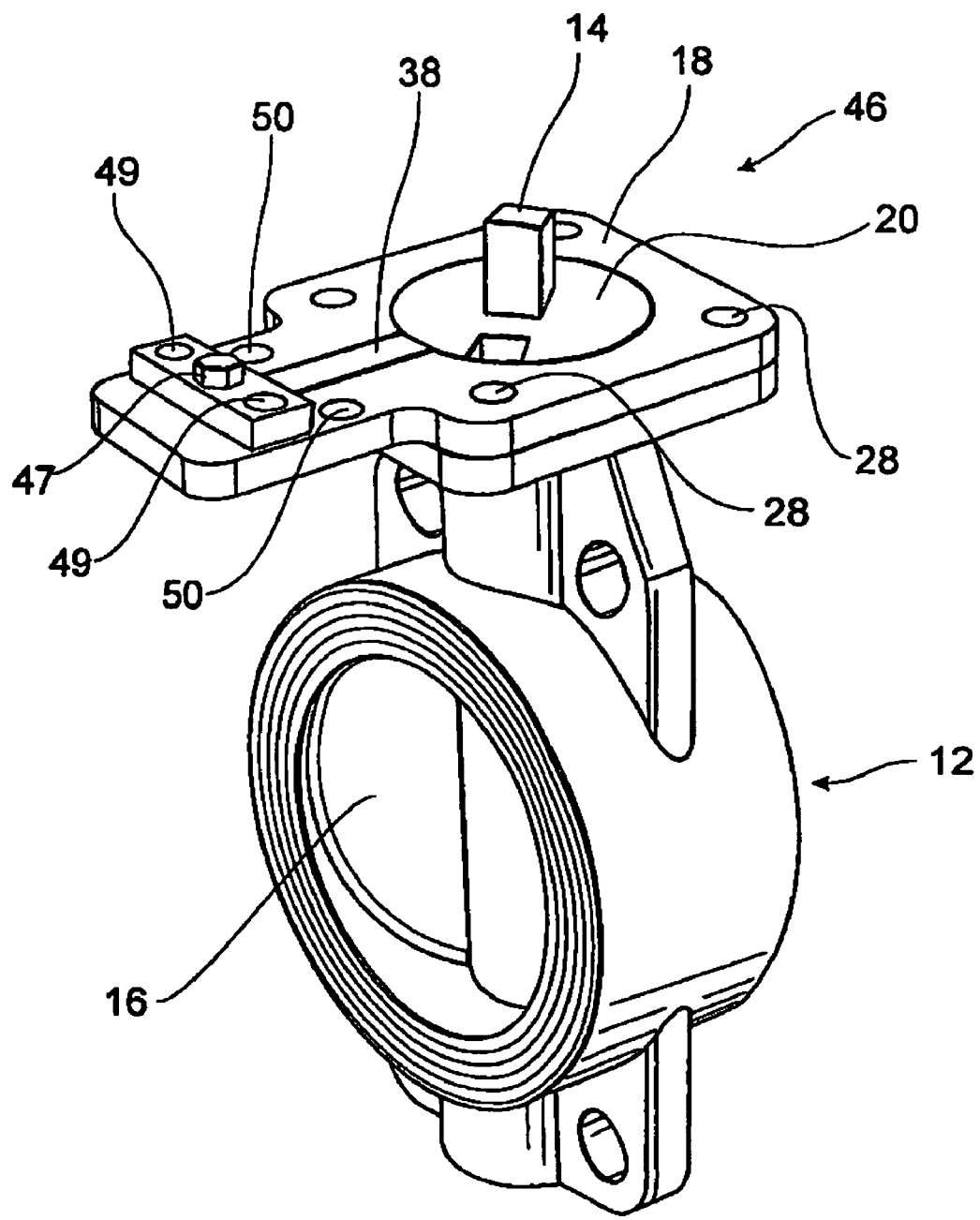
FIG. 2 is an isometric view of the butterfly valve and valve lock of FIG. 1, as assembled, with the valve lock in an unlocked position.

Referring to FIG. 2, the spindle receiving disc 20 is positioned relative to the spindle 14 so that the spindle 14 passes through the square shaped hole 36 formed in the spindle receiving disc 20, and so that the spindle receiving disc 20 is received within the hole 30 that is formed in the plate 18. The key 22 is orientated relative to the plate 18 so that the rectangular sectioned bar 38 is received within the slot 32, and so that the rectangular sectioned cross member bar 40 is positioned away from the spindle receiving disc 20. By positioning the key 22 in this way the rectangular sectioned cross member bar 40 contacts a surface of th plate 18 which is opposite the surface of the plate 18 that contacts an end 10 of the butterfly valve 12.

The cylindrically shaped spindle receiving disc 20 fits into a recess 44 (see FIG. 1) which is formed in the end 10 of the butterfly valve 12. The diameter of the recess 44 is slightly larger than the diameter of the spindle receiving disc 20, and the spindle 14 is positioned centrally relative to the recess 44. The spindle receiving disc 20 can therefore be fitted into the recess 44. The thickness of the spindle receiving disc 20 is greater than the thickness of the plate 18. The increased thickness of the spindle receiving disc 20 compared with the thickness of the plate 18 increases the capability of the spindle receiving disc 20 to withstand loads which are applied by the spindle 14 when the key 22 is received within the square shaped slot 34.

While the recess 44 is formed in the end 10 of the butterfly valve 12, some valves may not have a recess corresponding to the recess 44. in such cases, the thickness of the spindle receiving disc 20 will be limited to the thickness of the plate 18. In some cases the length of the spindle 14 will be such that the thickness of the plate which receives the spindle receiving disc can be increased to enable the thickness of the spindle receiving disc to be equivalent to the thickness of the spindle receiving disc 20. However, in other cases, the length of the spindle 14 will be such that the thickness of the spindle receiving disc must be less than the thickness of the spindle receiving disc 20. Depending on the particular valve and application, it may be desirable to produce the spindle receiving disc 20 from materials which enable the spindle receiving disc to withstand loads applied by a corresponding spindle which the spindle receiving disc 20 is capable of withstanding.

With the plate 18 fitted against the end 10 of the butterfly valve 12, and the spindle receiving disc 20 and key 22 appropriately assembled in the plate 18, the valve actuator (not shown) can be appropriately bolted to the butterfly valve 12 to clamp the assembled valve lock 46 (see FIGS. 2 and 3) between the butterfly valve 12 and the valve actuator. With the assembled valve lock 46 clamped between the butterfly valve 12 and the valve actuator, the rectangular sectioned cross member bar 40 can be moved toward and away from the spindle 14 to move the valve lock 46 between locked and unlocked positions respectively, as long as the slot 34 of the spindle receiving disc 20 is appropriately positioned to receive an end of the rectangular sectioned bar 38. An exposed bolt head 47 and corresponding nut 48 make gripping and subsequent moving of the key 22 between locked and unlocked positions easier.

Appropriate orientation of the spindle receiving disc 20 relative to the square sectioned spindle 14 prior to insertion of the spindle 14 through the square shaped hole 36 is required to ensure correct and safe operation of the assembled valve lock 46. The spindle receiving disc 20 can be orientated so that the square shaped slot 34 of the spindle receiving disc 20 is positioned at four different positions about a longitudinal axis of the spindle 14. Each of the four positions are either 90 degrees or 180 degrees out of phase relative to each of the other positions. The correct orientation of the square shaped slot 34 relative to the spindle 14 is therefore required prior to assembly of the assembled valve lock 46. To ensure correct orientation, the position of the valve 16 of the butterfly valve 12 must be taken into consideration when inserting the spindle 14 through the square shaped hole 36 of the spindle receiving disc 20. One method of ensuring appropriate orientation of the spindle receiving disc 20 prior to assembly is to place the valve 16 of the butterfly valve 12 in a position which the valve 16 is required to be locked in by the assembled valve lock 46 prior to assembly of the assembled valve lock 46. With the valve 16 positioned in this manner, the spindle receiving disc 20 can be orientated relative to the spindle 14 so that assembly of the assembled valve lock 46 results in the square shaped slot 34 being suitably positioned for receipt of the rectangular sectioned bar 38 of the key 22. After assembly of the assembled valve lock 46 the key 22 can be moved to the locked position to check that the rectangular sectioned bar 38 is able to be received within the square shaped slot 34 when the valve 16 is in a position which is required to be locked by the assembled valve lock 46. The position in which the valve 16 of the butterfly valve 12 is required to be locked in could be either a fully open or fully closed position. The locking position can be adjusted by disassembling the assembled valve lock 46 and appropriately orientating the spindl receiving disc 20 prior to reassembling th assembled valve lock 46.

Some ball valves require a 180 degree rotation of an operating spindle between closed and open positions. By appropriately orientating spindle receiving disc 20 prior to assembly of an assembled valve lock such as the valve lock 46, the spindle receiving disc 20 which has a single square shaped slot 34 can be used to lock such a ball valve in any one of the following positions: fully open; partially open; and closed.

Figure 3:
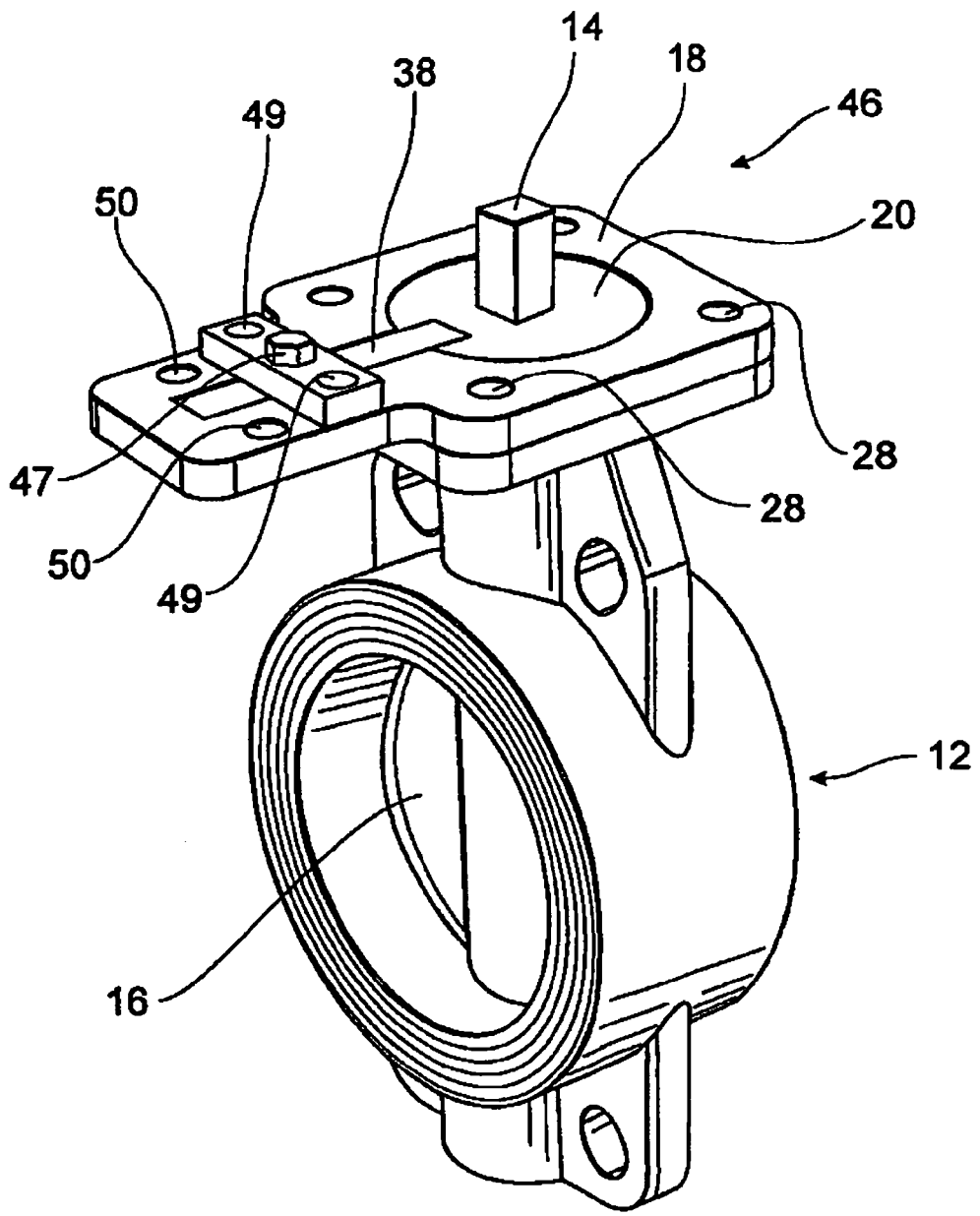
FIG. 3 is an isometric view similar to FIG. 2 with the valve lock in a locked position.

Referring to FIGS. 1–3, corresponding holes 49 and 50 are provided in opposite ends of the rectangular sectioned cross member bar 40, and the plate 18, either side of the rectangular slot 32. The holes 49 and 50 enable the key 22 to be fixed in either the locked position or unlocked position by passage of bolts therethrough.

Figure 4A:
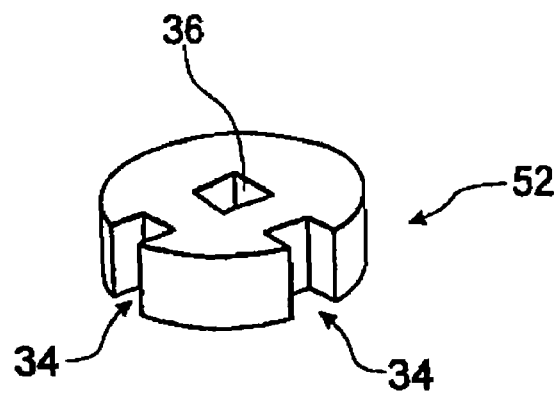
FIGS. 4a and 4b and 4c are isometric views of alternative spindle receiving discs of the valve lock of FIG. 1.

In some situations it may be important that a valve is able to be locked in more than one position. Alternative spindle receiving discs 52, 54, and 56 of FIGS. 4a, 4b, and 4c respectively are examples of spindle receiving discs that can be used in these situations. The alternative spindle receiving disc 52 has two square shaped slots 34 which are identical to the square shaped slot 34 of FIGS. 1—3. The square shaped slots 52 of FIG. 4a are positioned so that they extend at 90 degrees relative to each other. By replacing the spindle receiving disc 20 of the assembled valve lock 46 with the alternative spindle receiving disc 52, the assembled valve lock 46 can be used to lock the valve 16 of the butterfly valve 12 in opposite positions. For example, the alternative spindle receiving disc 52 can be used to lock the butterfly valve 12 in fully open and fully closed positions.

The alternative spindle receiving disc 54 has two square shaped slots 34 which are identical to the square shaped slots 34 of FIG. 4a. However, the spindle receiving disc 54 of FIG. 4b differs from the spindle receiving disc 52 of FIG. 4a in that the square shaped slots 34 are positioned opposite each other. The alternative spindle receiving disc 54 can be used in place of the spindle receiving disc 20 to form an assembled valve lock 46 which is capable of locking a specific type of ball valve, which requires a 180 degree rotation of an operating spindle between open and closed positions, in fully open and fully closed positions.

Figure 4B:
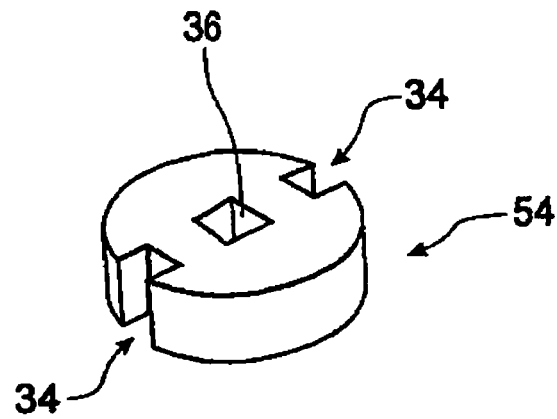
Figure 4C:
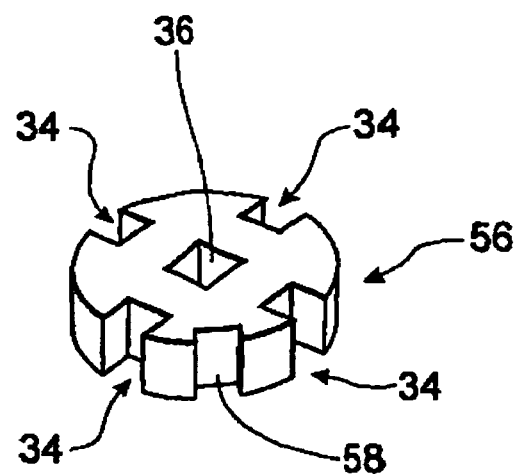

The alternative spindle receiving disc 56 of FIG. 4c has four square shaped slots 34 which are identical to the square shaped slots 34 of FIGS. 4a and 4b, and a fifth rectangular shaped slot 58. The square shaped slots 34 are equidistantly spaced from each other around the spindle receiving disc 56 so that each square shaped slot 34 extends at an angle of 90 degrees relative to adjacent square shaped slots 34. The rectangular shaped slot 58 is positioned between two adjacent square shaped slots 34 and is equally distantly spaced from each adjacent slot 34. The rectangular shaped slot 58 extends through the thickness of the spindle receiving disc 56 as do the square shaped slots 34. While the rectangular shaped slot 58 is as wide as the square shaped slots 34, it is approximately half the depth of the square shaped slots 34. By reducing the depth of the rectangular shaped slots 58 relative to the depth of the square shaped slots 34, the effect of the rectangular shaped slot 58 on the structural integrity of the spindle receiving disc 56 is decreased. The spindle receiving disc 56 can be used to lock a butterfly valve in fully open and fully closed positions by engagement between a member such as the rectangular sectioned bar 38 of the key 22 and one of the square shaped slots 34 of the spindle receiving disc 56. The spindle receiving disc 56 can be used to lock a butterfly valve in the fully open and fully closed positions, regardless of how the spindle receiving disc 56 was orientated prior to insertion of the square sectioned spindle 14 of the butterfly valve 12 into the square shaped hole 36 of the spindle receiving disc 56. The rectangular shaped slot 58 enables the valve 16 of the butterfly valve 12 to be locked in a partially opened position by engagement between the rectangular sectioned bar 38 of the key 22, and the rectangular sectioned slot 58. The spindle receiving disc 56 is required to be appropriately orientated prior to insertion of the spindle 14 through the square shaped hole 36 to enable the rectangular shaped slot 58 to be engaged by the rectangular sectioned bar 38.

While the spindle receiving discs 52, 54 and 56 enable a valve to be locked in more than one position, for example, fully open and fully closed positions, in the case of spindle receiving discs 52 and 54, and fully open, fully closed and partially open positions in the case of the spindle receiving disc 56, there are possible safety related disadvantages associated with spindle receiving discs 52, 54 and 56 that do not ads with use of spindle receiving discs such as spindl receiving disc 20 which provide a single locked position. The potential safety issu s associated with spindle receiving disc 52, 54 and 56 arise because a valve can be locked in more than one position. If the spindle receiving disc 20 is appropriately orientated relative to the spindle 14, prior to insertion of the square sectioned spindle 14 into the square shaped hole 36 of the spindle receiving disc 20, engagement between the rectangular sectioned bar 38 and square shaped slots 34 ensures that the valve 16 of the butterfly valve 12 is locked in the required position. As such, simple inspection of whether or not the key 22 is in the locked position ensures that the valve 16 is in a position which will not endanger workers working in the vicinity of the butterfly valve 12. However, in the case of the alternative spindle receiving discs 52, 54 or 56, engagement between the rectangular sectioned bar 38 and square shaped slot 34 means that a valve which is associated with a valve locking incorporating alternative spindle receiving discs 52, 54 or 56 could be in either a fully open or closed position. In cases where the alternative spindle receiving disc 54 is used with ball valves that require rotation of an operating spindle through 180 degrees between open and closed positions, engagement between the rectangular sectioned bar 38 and square shaped slot 34 could also mean that an associated valve is in a partially open position. Engagement between the rectangular slot 58 of the alternative spindle receiving disc 56 indicates that an associated valve is in a partially open position. The position of a valve (ie. whether it is in an open, closed or partially open position) associated with valve locks incorporating spindle receiving discs 52, 54 or 56 is therefore not ascertainable by visual inspection of whether the key 22 is in a locked position. Engagement between the rectangular sectioned bar 38 and rectangular shaped slot 58 of the spindle receiving disc 56 would result in the key 22 being in a slightly different position to the locked position corresponding to engagement of the key 22 with the square shaped slots 34. However, the locked positions corresponding to engagement with the rectangular shaped slot 58, and square shaped slots 34 could be easily confused.

It follows that additional safety procedures should be implemented with use of spindle receiving discs such as spindle receiving discs 52, 54 and 56 to ensure that associated valves are locked in a position which ensures safety of workers working in the vicinity of the associated valves. Such additional safety procedures could for example include the use of flow meters or proximity switches. They could also include additional visual inspection procedures. The additional visual inspection procedures could for example, in the case of a tank outlet, include visual inspection of the outlet to confirm whether an associated valve is in an open or closed position.

Although the spindle 14 of the butterfly valve 12 is a square sectioned spindle, the section of the spindle can be varied as long as the spindle receiving discs 20, 52 and 54 are correspondingly varied to enable engagement between the spindle receiving discs 20, 52 and 54, and the spindle 14. For example, the cross sectional shape of the spindle 14 could be hexagonal. The cross sectional shape could also corr spond to the shape formed by two oppositely positioned flats which extend along part of the longitudinal length of a cylindrically shaped spindle. A splined engagement system could also be used for providing engagement between the spindle receiving discs 20, 52 and 54, and the spindle 14.

Although the rectangular sectioned cross member bar 40 can be secured in the locked and unlocked positions by passage of bolts through aligned holes 49 and 50, in order to minimise the risk of the assembled valve lock 46 being moved from a locked position when it is important for the valve lock to be maintained in such a position, a safety padlock (not shown) is preferably used to fix the rectangular sectioned cross member bar 40 in the locked position.

The safety padlock includes two arms which are pivotally attached to each other. The end of the pivotally attached arms which are distal the pivot point are designed to overlap when the safety padlock is closed. Corresponding holes are formed in overlapping ends of the pivotally attached arms with each of the corresponding holes being suitable for insertion of a shackle of a padlock. A typical safety padlock includes five corresponding holes and is therefore capable of receiving up to five padlocks. Unless all of the padlocks are removed from corresponding holes of the safety padlock, the safety padlock cannot be removed from corresponding holes 49 and 50 of the assembled valve lock 46.

Employees whose safety is dependent upon whether a particular valve is in an open or closed position, can be assigned separate padlocks for us with the safety padlock. If a work r is to perform a task which requires a valve to be in either an open or closed position, prior to performing the task they can appropriately fix the assembled valve locking device 46 in an appropriately locked position by attaching their padlock to the safety padlock. In using this system it is obviously important that the different workers whose safety is dependent on the appropriate operation of a particular valve are issued with uniquely keyed padlocks. In situations where more than five workers may need to secure the assembled valve lock 46 in a locked position, safety padlocks which are capable of receiving more than five padlocks should be designed for this purpose.

As an alternative to the use of the safety padlock, separate padlocks may be used to secure a key 22 in the locked and unlocked positions by passage of a shackle of each padlock through separate corresponding holes of the key 22 and plate 18. Such a method would work well for example if there are only two workers whose safety is at risk by the appropriate operation of a valve. In this situation, the workers could have uniquely keyed padlocks which at all times could be used to secure the assembled valve lock 46 in either a locked or unlocked position. In cases where the safety of more than two workers, for example four workers, is dependent upon the appropriate operation of a valve, the rectangular sectioned cross member bar 40 and plate 18 could be altered as follows. The length of the rectangular sectioned cross member bar 40 could be extended, and the dimensions of the plate 18 could als b appropriate altered, to enable two additional holes similar to holes 49 to be formed in the rectangular sectioned cross member bar 40, and additional holes similar to holes 50 to be formed in the plate 18 to enable the key 22 to be secured in locked and unlocked positions by four separate padlocks. As in the case of the previous examples, by utilising four uniquely keyed padlocks, the four workers can ensure that at any given time the key 22 is secured in a locked or unlocked position, in accordance with their safety requirements.

As explained above, the assembled valve locking device 46 of FIGS. 2 and 3 is designed to lock the valve 16 in one or more specific positions by engagement between the rectangular sectioned bars 38 and the spindle receiving disc 20. The particular form of engagement described above involves receipt of the rectangular sectioned bar 38 into a rectangular shaped slot 34 of the spindle receiving disc 20. However, the present invention is not limited to the specific form of engagement shown in FIGS. 1–4. For example, engagement could be provided by insertion of a rod or bar into a hole appropriately formed into the spindle receiving disc 20. The present invention is also not limited to the specific mechanism of FIGS. 1–3 by which engagement is effected.

For example, the key 22 could be designed to engage two or more flat surfaces which are formed in an external circumferential surface of the spindle receiving disc 20, and positioned opposite each other. To enable this form of engagement the rectangular sectioned bar 38 would need to be wide enough to enable a slot to be formed in one of its ends that is suitable for engaging with the aforementioned flat surfaces of the spindle receiving disc 20. Additional material would need to be removed from the plate 18 for receipt of the alternative key 22, and to enable the alternative key 22 to move between locked and unlocked positions.

Regarding the mechanism by which the engagement is effected, the mechanism could for example involve pivotal movement of an alternative rectangular sectioned bar (not shown) which provides a function corresponding to the function of the rectangular sectioned bar 38. The alternative rectangular sectioned bar could be pivotally attached via a first end so that a second end moves into and out of the slot 32 with pivotal movement of the alternative rectangular sectioned bar. With the rectangular shaped slot 34 appropriately orientated relative to the alternative rectangular sectioned bar pivotal movement of the alternative rectangular sectioned bar into the slot 32 would result in receipt of the second end of the rectangular sectioned bar within the rectangular shaped slot 34. Movement of the alternative rectangular sectioned bar out of the slot 32 would require the alternative sectioned bar moving toward the actuator. The actuator would therefore need to be designed with this movement in mind so that movement of the alternative rectangular sectioned bar to a positioning which does not engage the rectangular shaped slot 34 would not be prevented by the actuator housing.

The invention claimed is:

1. A valve locking device, comprising:
an intermediate member mountable between a valve body and valve actuator and securable to either the valve body or valve actuator;
a stem attachment member contained at least partially within the intermediate member and adapted to cooperate with a valve stem associated with the valve body; and
a moving engagement member, located within the intermediate member and being engageable with the stem attachment member for preventing rotation of the valve stem.

2. The valve locking device of claim 1, wherein:
the intermediate member further comprises a plate having a central opening which is intersected by a slot;
the engagement member reciprocating in the slot, into and out of engagement with the stem attachment member.

3. The valve locking device of claim 1, wherein:
the stem attachment member further comprises an opening which extends through it, the opening adapted to receive the valve stem.

4. The valve locking device of claim 1, wherein:
the stem attachment member is thicker than the intermediate member.

5. The valve locking device of claim 2, wherein:
engagement member is a key having a rectangular cross-section.

6. The valve locking device of claim 5, wherein:
the key further comprises a rectangular cross-section cross member, located at one end of the key.

7. The valve locking device of claim 3, wherein:
the stem attachment member further comprises a disk having a circumference which is interrupted by a slot for receiving and end of the engagement member.

8. The valve locking device of claim 7, wherein:
the stem attachment member further comprises additional slots for receiving the end of the engagement member.

9. The valve locking device of claim 2, wherein:
the intermediate member further comprises an extension in which is formed the slot, the extension having one or more first holes formed in it;
the engagement member comprising a rectangular cross-section cross member, located at one end of the key, the cross member having one or more second holes;
the first and second holes cooperating by aligning with one another to fix the position of the engagement member relative to the intermediate member, by admitting an article to reside within the aligned first and second holes.

10. The valve locking device of claim 9, wherein:
the article is a padlock.

11. The valve locking device of claim 10, wherein:
there are two or more first holes and a like number of second holes and a like number of padlocks are provided so that two or more padlocks can be inserted through two or more aligned first and second holes.

12. The valve locking device of claim 4, wherein:
the attachment member resides, in part, in a recess in the valve body.

13. The valve locking device of claim 9, wherein:
the first holes correspond to locked and unlocked positions of the key.

14. A valve, comprising:
a valve body having a valve stem; and
a valve locking device, comprising an intermediate member mountable between a valve body and valve actuator and securable to either the valve body or valve actuator, a stem attachment member contained at least partially within the intermediate member and adapted to cooperate with a valve stem associated with the valve body; and a moving engagement member, located within the intermediate member and being engageable with the stem attachment member for preventing rotation of the valve stem.

15. The valve of claim 14, further comprising:
an actuator, the valve locking device being located between the actuator and the valve body.

* * * * *